United States Patent [19]

Hsiao et al.

[11] Patent Number: 5,051,669
[45] Date of Patent: Sep. 24, 1991

[54] VOICE COIL MOTOR

[75] Inventors: Yen-Yuan Hsiao; Nan-Yang Wu; Sheng-Fang Cheng, all of Hsin-chu, Taiwan

[73] Assignee: Industrial Technology Research Institute, Hsinchu, Taiwan

[21] Appl. No.: 507,518

[22] Filed: Apr. 11, 1990

[51] Int. Cl.⁵ .......................................... H02K 33/00
[52] U.S. Cl. ..................................... 318/119; 310/36; 310/154; 310/182; 360/106
[58] Field of Search ................... 360/106; 310/13, 36, 310/38, 179, 182, 154; 318/119

[56] References Cited

U.S. PATENT DOCUMENTS

| | | | |
|---|---|---|---|
| 4,490,635 | 12/1984 | Harrison et al. | 360/106 |
| 4,573,094 | 2/1986 | Gibeau et al. | 360/106 |
| 4,864,447 | 9/1989 | Takekado et al. | 360/106 |
| 4,916,342 | 4/1990 | Hirano et al. | 310/36 |
| 4,945,435 | 7/1990 | Boigenzahn et al. | 360/106 |

OTHER PUBLICATIONS

IEEE Transactions on Magnetics; vol. Mag-18; No. 3; 5/82; K. S. Ananthanarayanan; pp. 3-7.

IEEE Transactions on Magnetics; vol. Mag-19; No. 5; 5/83; J. A. Wagner; pp. 2-4.

Primary Examiner—R. Skudy
Attorney, Agent, or Firm—Cushman, Darby & Cushman

[57] ABSTRACT

A voice coil motor includes an upper yoke having a lower surface, and a lower yoke having an upper surface. Two upper side yokes are attached to the lower surface of the upper yoke respectively at laterally opposite end positions on the lower surface of the upper yoke. Two lower side yokes are attached to the upper surface of the lower yoke respectively at laterally opposite end positions on the upper surface of the lower yoke. A central yoke has two distal end portions respectively sandwiched between the upper side yokes and the lower side yokes. An upper magnet is attached to the lower surface of the upper yoke and located above the central yoke. A lower magnet is attached to the upper surface of the lower yoke and located beneath the central yoke. A rotary arm is pivotally mounted on the upper yoke. The rotary arm has a coil wound around the central yoke with a spacing being maintained therebetween so that the rotary arm is allowed to pivot along the central yoke. The voice coil motor is characterized in that the motor includes at least one shorted turn fitted around one of the side yokes.

1 Claim, 7 Drawing Sheets (Prior Art)

VOICE COIL MOTOR

BACKGROUND OF THE INVENTION

The present invention relates generally to a voice coil motor (abbreviated as VCM) and, more particularly, to a voice coil motor provided with a set of improved shorted turn.

Typically, a shorted turn is disposed in a voice coil motor which is conventionally incorporated into a magnetic disk drive or an optical disk drive. It is desired that the inductance of a coil in the voice coil motor will decrease as a result of the incorporation of the shorted turn so as to decrease the access time of a magnetic head in the disk drive.

As shown in FIGS. 1, 2, 7 and 8 (all prior art), a conventional voice coil motor 10 includes an upper sectoral yoke 12, a lower sectoral yoke 14, a central arcuate yoke 16, two upper side yokes 18 and 20, two lower side yokes 22 and 24, an upper magnet 26, a lower magnet 28, and a rotary arm 30. The two upper side yokes 18 and 20 are respectively disposed at laterally opposite end positions on a lower surface of the upper yoke 12. The two lower side yokes 18 and 20 are respectively disposed at laterally opposite end positions on an upper surface of the lower yoke 14. The two distal end portions of the central yoke 16 are respectively sandwiched between the two upper side yokes 18 and 20 and the two lower side yokes 22 and 24. Bolts or screws are used to fasten the upper and lower sectoral yokes 12 and 14, the upper and lower side yokes 18, 20, 22, 24 and the central yoke 16 together (as shown in FIG. 8 (prior art)). The rotary arm 30 is pivotally mounted on the upper yoke 12 and has a through hole 32 at a tail end thereof. A coil 34 is wound along the inside wall of the through hole 32, and is shown removed from the through hole 32 in FIG. 2. (prior art). The tail end of the rotary arm 30 is mounted to the central yoke 16 with the yoke 16 extending through the through hole 32. A spacing is maintained between the central yoke 16 and the rotary arm 30 so that the coil 34 will not interfere with the yoke 16 when the rotary arm 30 is pivoted. When incorporated in a magnetic disk drive or an optical disk drive 5 as shown in FIG. 1 (prior art), the rotary arm 30 is provided with several magnetic heads 36 at a leading end thereof. A conventional shorted turn 40 is arranged to surround the central yoke 16 and is thus in the form of a hollow arcuate tube having a rectangular cross section which corresponds to the cross section of the central yoke 16 (FIGS. 7 and 8 (both prior art)).

For a magnetic disk drive, the access operation which a read/write head executes on a disk is driven by a voice coil motor. As mentioned above, the purpose of providing the shorted turn 40 is to reduce the resultant inductance of this moving coil, and then shorten the access time. The decrease in coil inductance can decrease the time constant (inductance/resistance) directly and increase its response sensitivity. However, there are other factors such as the magnitude of output of VCM, which is determined by field magnetic flux density and coil length. The minimum access time can not be attained merely by decreasing the inductance of coil, nor by improving any factor unilaterally.

From an article, "The Actuator in High Performance Disk Drives: Design Rules for Minimum Access Time", J. Arthur Wagner, *IEEE Transactions on Magnetics*, Vol. MAG-19, No. 5, Sept. 1983, it may be understood that the parameters which affect the access time of a voice coil motor include:

1) moment inertia (mass if a linear movement);
2) torque constant ( $K_T=BLr$ ) ($K_T=BL$ if a linear movement);
3) voltage applied;
4) resistance of coil; and
5) inductance of coil (including shorted turn).

If values for the torque constant and the inductance are changed by 10% respectively, the access time will be changed by 4 to 5% and 0 to 1.5% respectively. Therefore, it may be understood that the torque constant value is more sensitive to the access time than the inductance. That is, it is more effective to increase the torque constant value than to decrease the inductance value. For the same coil, the magnitude of the magnetic flux density is more important than the inductance.

The conventional shorted turn identified above is mounted on the central yoke. Although it is said that the conventional shorted turn may decrease the inductance to a minimum value, it has been noted that the thickness of shorted turn causes an increase in the spacings between the magnets 26, 28 and the central yoke 16. Inevitably, each magnetic flux density decreases as the spacing increases. It is therefore a disadvantageous effect to the access time. Furthermore, the conventional shorted turn 40 is unmovably fitted around the central yoke and difficult to manufacture and assemble. The invention should also assure that when the rotary arm 30 pivots and thus moves, the coil 34 along the shorted turn 40, it the coil 34 does not interfere with the shorted turn 40. Since the spacing between coil 34 and shorted turn 40 is intended to be kept small, the accuracy for machining a conventional shorted turn is required to be high. If a voice coil motor for driving a linear movement and having a shorted turn in the form of a hollow, rectangular-section sleeve is manufactured, a precise wire discharge cutting machine is needed. Instead, if a voice coil motor for driving a rotary movement and having a shorted turn in the form of an above-mentioned arcuate, hollow, rectangular-section sleeve is manufactured, still more difficulties encountered plus a higher cost is incurred.

In the field of manufacture of the voice coil motor, the limit to the use of materials has been reached. That is to say, the access time of magnetic disk drives on the same product design order has reached its limit.

SUMMARY OF THE INVENTION

It is therefore a primary object of the present invention to provide an improved construction for the shorted turn of a voice coil motor which will save cost and reduce the access time of the motor.

In accordance with the present invention, a voice coil motor includes an upper yoke having a lower surface, and a lower yoke having an upper surface. Two upper side yokes are attached to the lower surface of the upper yoke resepctively at laterally opposite end positions on the lower surface of the upper yoke. Two lower side yokes are attached to the upper surface of the lower yoke respectively at laterally opposite end positions on the upper surface of the lower yoke. A central yoke has two distal end portions respectively sandwiched between the upper side yokes and the lower side yokes. An upper magnet is attached to the lower surface of the upper yoke and located above the central yoke. A lower magnet is attached to the upper surface of the lower yoke and located beneath the central yoke. A rotary arm is pivotally mounted on the upper yoke. The rotary arm has a coil wound around the central yoke with a spacing being maintained between the coil and the central yoke so that the rotary arm is allowed to pivot. The voice coil motor is characterized in that the motor includes at least one shorted turn fitted around one of the side yokes.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
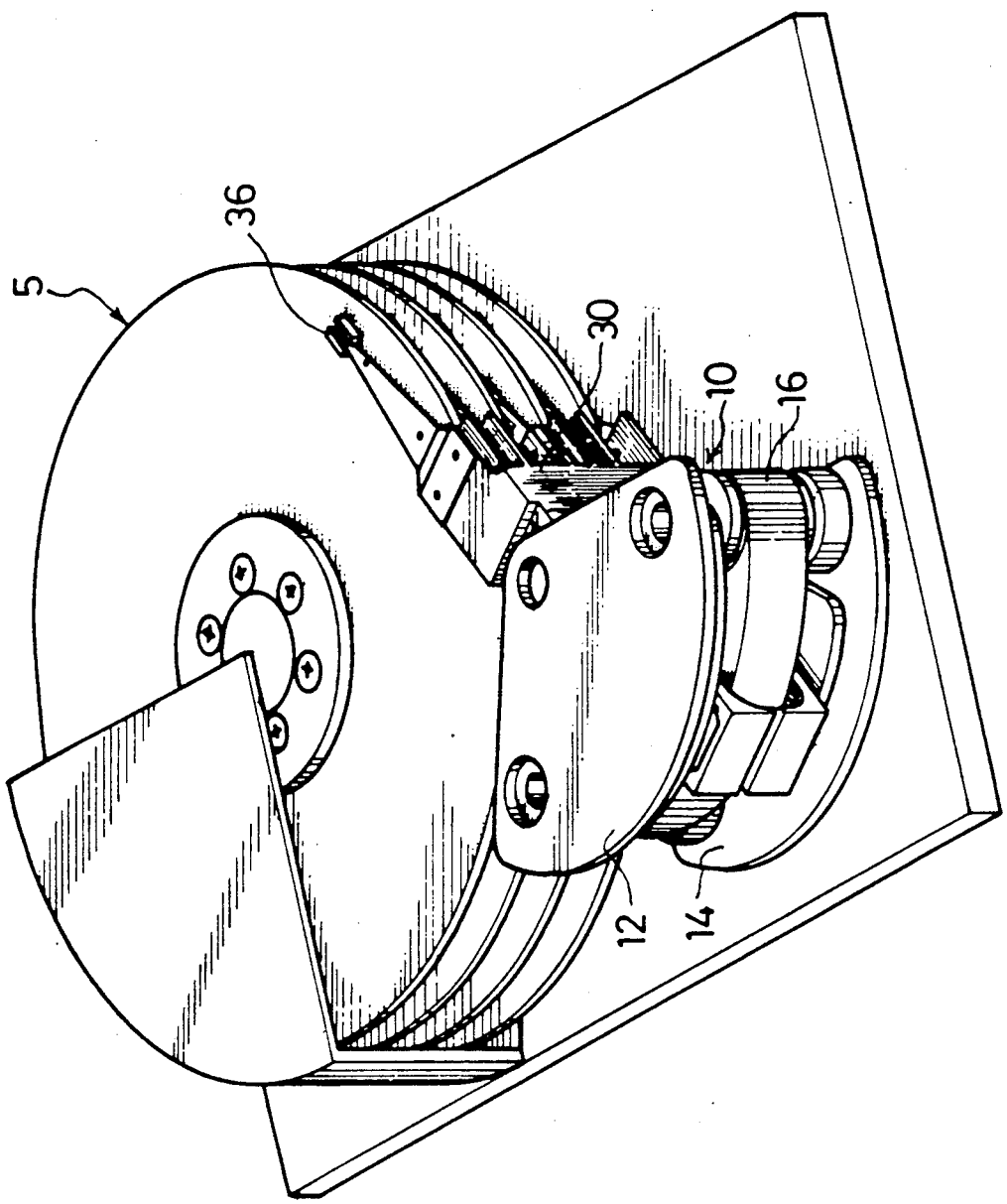
FIG. 1 (prior art) is a schematic perspective view showing a voice coil motor according to a preferred embodiment of the present invention, while incorporated into a magnetic disk drive.
Figure 2:
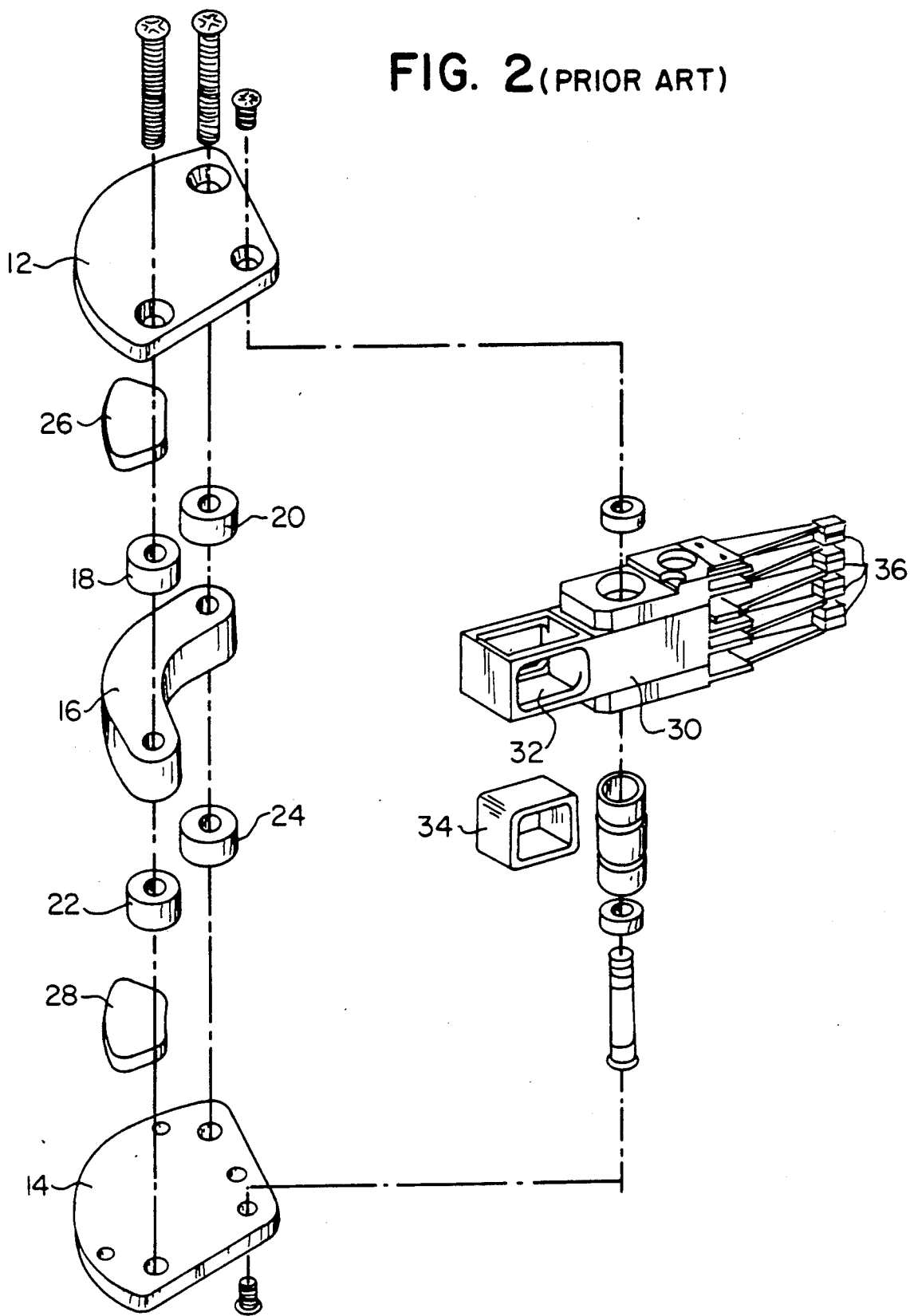
FIG. 2 (prior art) is a schematic perspective view showing a rotary arm of the voice coil motor shown in FIG. 1.
Figure 3:
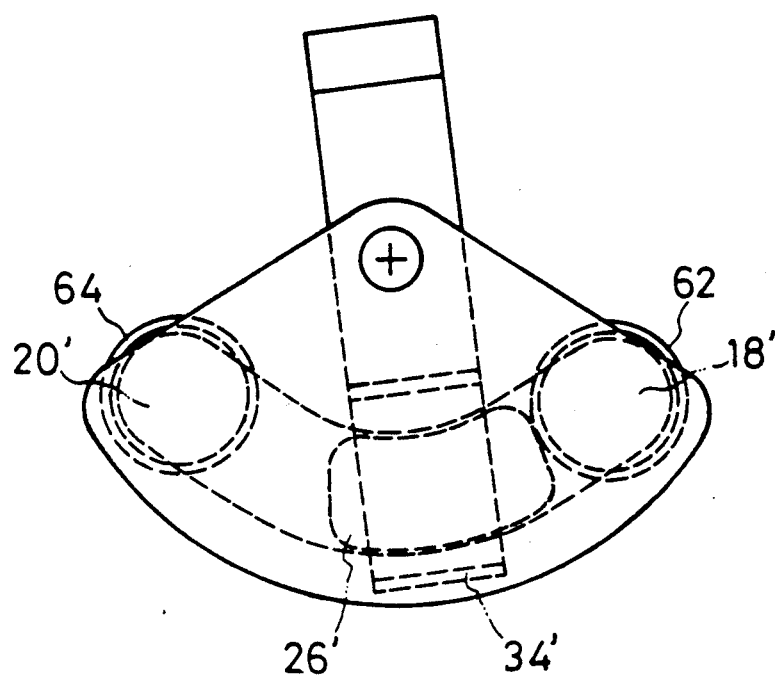
FIG. 3 is a top elevational view of the voice coil motor of the present invention.
Figure 4:
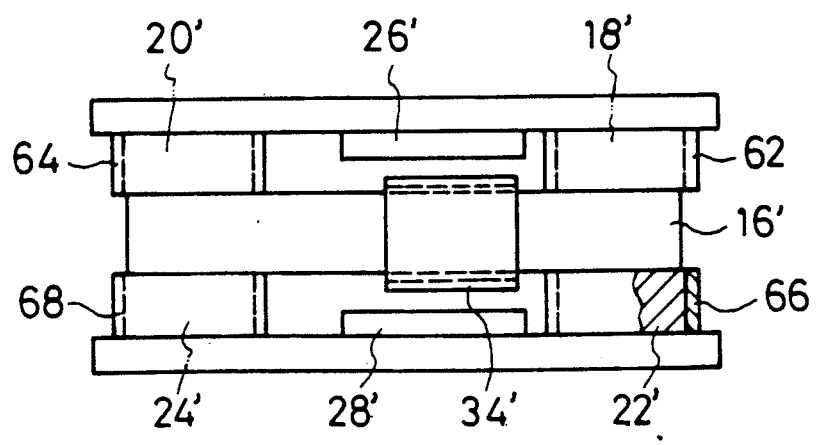
FIG. 4 is a partially fragmentary, front elevational view of the voice coil motor of the present invention.

A conventional shorted turn has disadvantages in that it is difficult to manufacture and that the magnatic flux density is reduced. To solve those problems, the inventors of the present invention have carried out a series of studies and experiments. An improved voice coil motor is therefore obtained. Referring to FIGS. 3 and 4, in the voice coil motor of the present invention, four shorted turns 62, 64, 66 and 68 are each fitted around one of the two upper side yokes 18', 20' and the two lower side yokes 22', 24', respectively. No shorted turn is provided around the central yoke 16' in the voice coil motor of the present invention.

Since each of shorted turns 62-68 is fitted respectively around one of the side yokes 18'-24', the coil 34' will not interfere with any one of the shorted turns 62-68 when the coil 34' moves within its pivotal travel. Accordingly, the shorted turns 62-68 used in the present invention need not have high accuracy in their dimensions. The cost of manufacturing the shorted turns 62-68 may be substantially reduced. If side yokes having cylindrical profiles are adopted, the shorted turns needed may be more easily manufactured by using a general lathe. The manufacturing cost is further reduced.

In view of the fact that the shorted turns 62-68 of the present invention are not fitted around the central yoke 16', the spacing between the central yoke 16' and the magnets 26', 28' need not be increased and, therefore, the magnetic flux density is not reduced. Since the magnetic flux density is held the same and because the inductance is decreased due to the arrangement of the shorted turns 62-68, the access time is reduced.

In view of the fact that the shorted turns of the present invention are fitted around the respective side yokes, the coil 34' may be made small so that the weight of coil 34' and, therefore, the moment inertia thereof may be reduced so as to promote the increase in the rotation speed of the voice coil motor. The height of the voice coil motor of the present invention may be decreased, although the lateral width thereof may be slightly increased. In the design of a rotary type voice coil motor, the limitation on height is much more rigid than that on lateral width. The present invention is thus advantageous in this respect. Although the inductance of the voice coil motor of the present invention is slightly larger than that of a conventional voice coil motor, the magnetic field intensity of the voice coil motor of the present invention is higher than that of a conventional voice coil motor and the moment inertia of the present invention is relatively reduced. Therefore, the access time of the present invention may be effectively reduced. Also, the cost for the present invention is substantially reduced.

COMPARISON

The advantages and effects of the present invention mentioned above may be more clearly understood from a comparison between a voice coil motor provided with a conventional shorted turn and a voice coil motor provided with the shorted turns of the present invention. A voice coil motor provided with no shorted turn serves as a comparative example. Assuming that the coil, magnets, yokes and the voltage applied in these three motors are all the same, the thickness of each of the shorted turns is 1 mm, and the spacings between the coil and magnets are the same as that between the coil and the central yoke (further including the shorted turn 40 in the case of the conventional voice coil motor).

Figure 5:
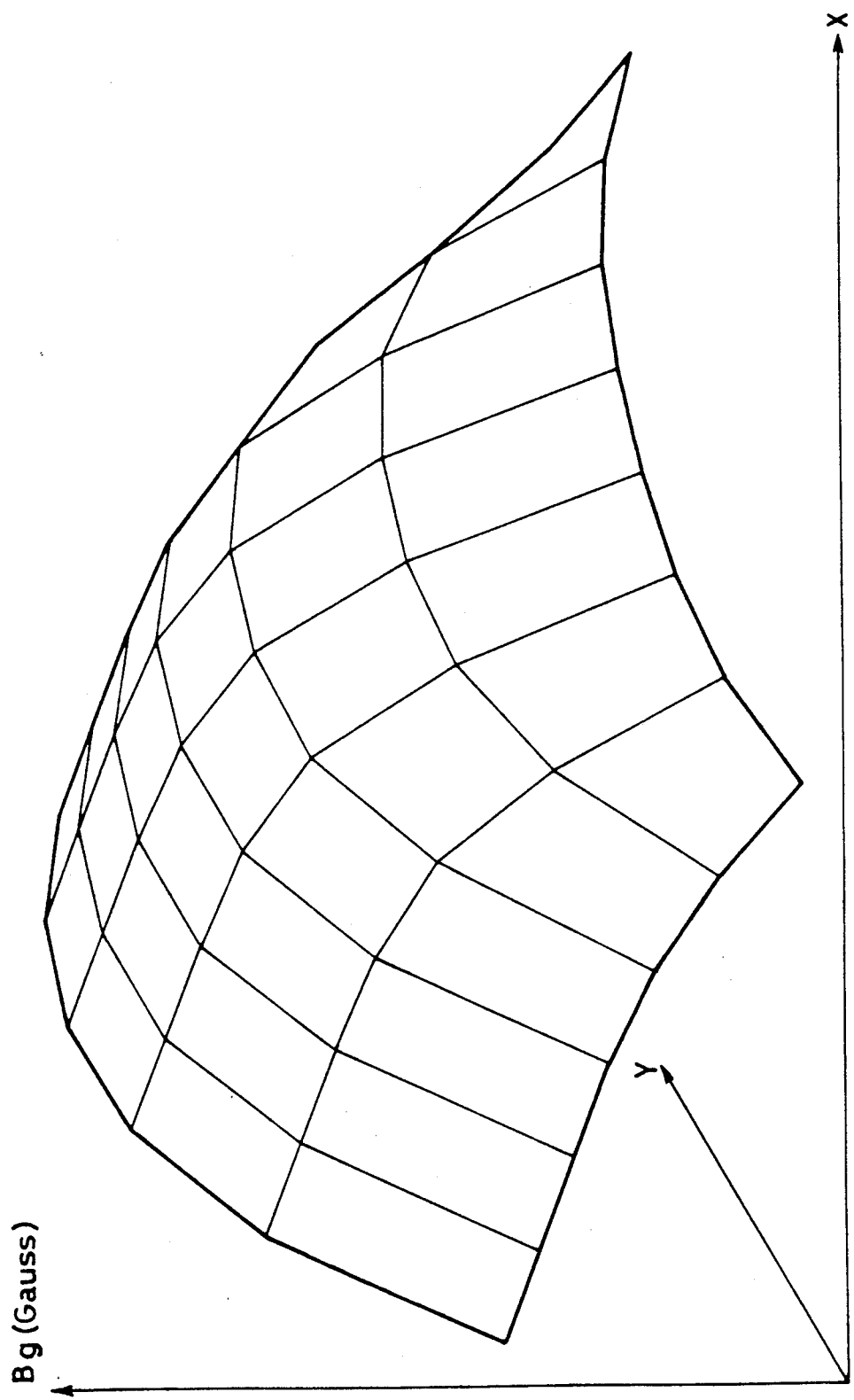
FIG. 5 is a diagram showing the distribution of magnetic field obtained from a magnetic field analysis by using the Finite Element Method.
Figure 9:
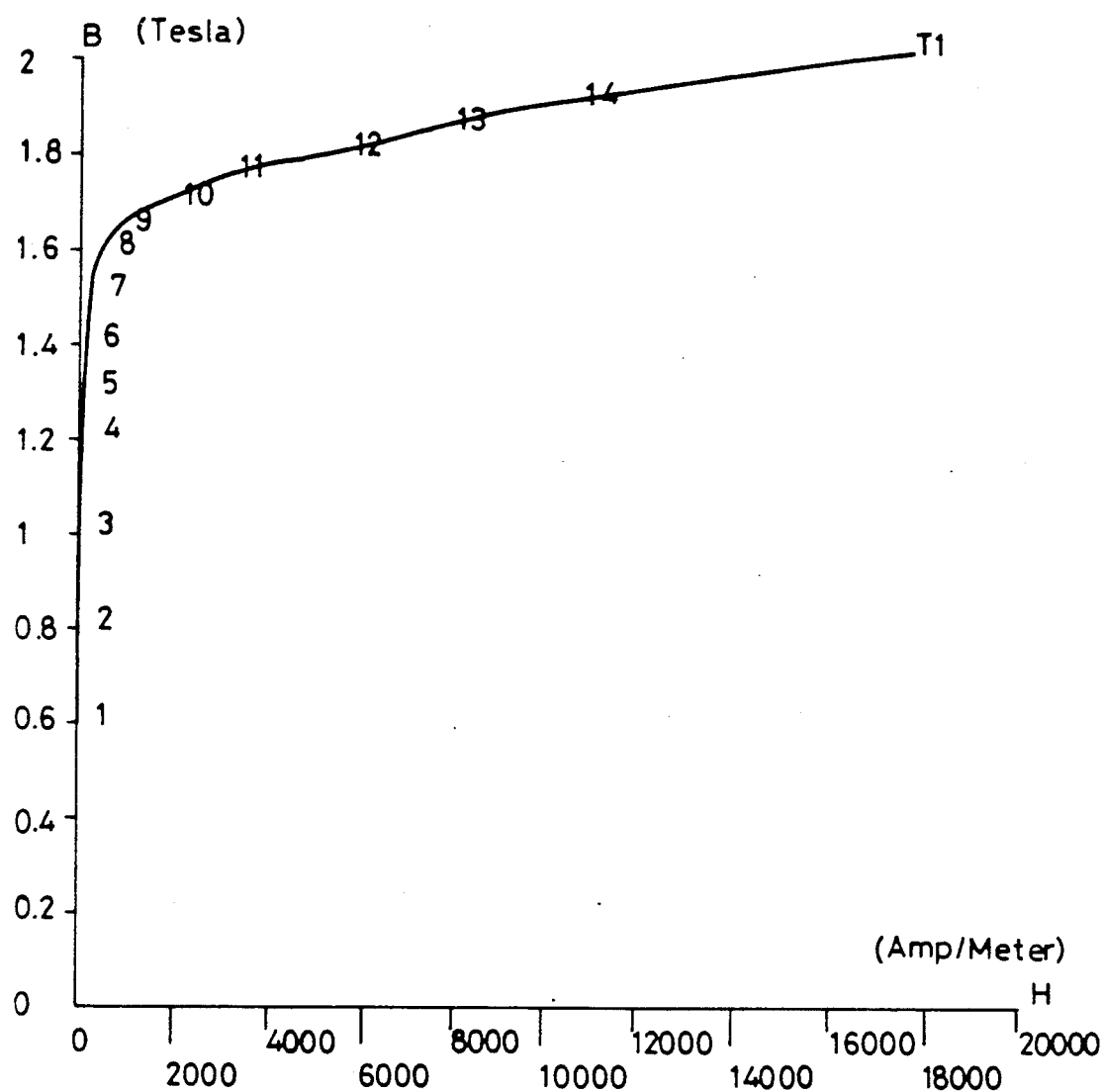
FIG. 9 is a chart showing a B-H curve for a pure iron material.
Figure 10:
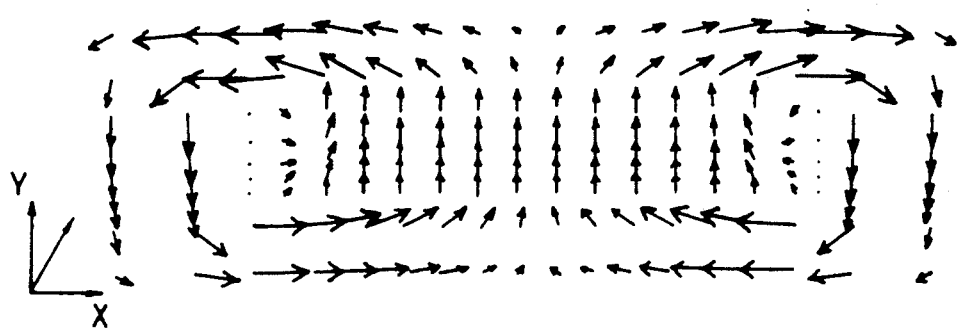
FIG. 10 is a diagram showing the directions of lines of magnetic force for an upper magnet disposed in the voice coil motor shown in FIGS. 4 and 8.

By executing a magnetic field analysis using the known Finite Element Method (abbreviated as FEM), the distribution of the magnetic fields of the voice coil motors (as shown in FIG. 5), the volume mean values of the magnetic flux density during the travel of the motors, and the inductance values of the motors may be obtained. FIGS. 9 and 10 show data related to a FEM magnetic field analysis. FIG. 9 shows a B-H curve for a soft magnetic material, such as pure iron. For a CRUCIBLE magnetic material, such as a material of No. CRUMAX 355, the remanent flux density Br is 12.3 KG and the coercive force Hc is 11.3 KOe. FIG. 10 diagrammatically shows the directions of lines of magnetic force for the upper magnets 26, 26' disposed in the voice coil motors of the present invention and the conventional voice coil motor.

An error of approximately 100 G exists between the result of the FEM magnetic field analysis and the values obtained from experiments. The parameters for the comparative example, the conventional voice coil motor and the present invention are as follows:

1) Comparative example:
No shorted turn is provided. The spacing between each of the magnets and the central yoke is 2.74 mm.

The magnetic flux density is 5.64 KG, and the coil inductance is 15 mH.

2) Conventional voice coil motor:

A shorted turn is fitted around the central yoke. The spacing between each of the magnets and the central yoke is increased to 3.4 mm. The magnetic flux density is decreased to 4.76 KG, and the coil inductance is reduced to 7.5 mH.

3) The present invention:

Shorted turns are fitted around side yokes. The spacing between each of the magnets and the central yoke is still 2.4 mm. The magnetic flux density is still 5.64 KG, and the coil inductance is reduced merely to 10 mH.

According to known mathematical equations for time optimum (Bang-Bang) control, the access time may be obtained by simulation (condition for simulation: inertia $= 7.68 * 10^{-6} Kg*m^2$):

$$L(di/dt) + Ri = E - (K_t * V) \quad V = dx/dt$$
$$dv/dt = (K_t * i)/J \quad K_t = B*l*r$$

wherein:
L—coil inductance, Henry;
i—current passing through coil, Ampere;
R—coil resistance, Ohm (assuming 13 Ohms);
E—voltage applied, Volt (assuming 10 V);
$K_t$—torque constant;
B—magnetic flux density, 1 Tesla $= 10^4$ G;
l—effective length of coil, meter;
V—angular speed, rad/sec;
x—angular displacement, rad;
r—distance from coil to center of rotation, meter.

The results of the simulation mentioned above are listed in Tables I, II, III. Table I lists the result of the comparative example voice coil motor which is provided with no shorted turn. Table II lists the result of the conventional voice coil motor which is provided with a shorted turn around it central yoke. Table III lists the result of the voice coil motor of the present invention which is provided with four shorted turns each around one of its side yokes. In the cases of the comparative example and the present invention, an increase of approximately 18.5% in the magnetic flux density over the conventional voice coil motor is obtained.

TABLE I

VCM CONTROL PARAMETERS ANALYSIS - VCPA PROGRAM FOR VCM BANG-BANG CONTROL PARAMETERS CALCULATION BY THE THIRD-ORDER CONTROL THEORY

| input data | | |
|---|---|---|
| moment inertia | 7.680e-006 | $Kg*m^2$ |
| resistance of coil | 13.00 | Ohm |
| inductance of coil | 0.0150 | Henry |
| torque constant | 0.0730 | N*m/A |
| voltage applied | 10.0 | Volt |

| result | | |
|---|---|---|
| mechanical time constant | 0.0187 | sec |
| electrical time constant | 1.1538 | ms |
| natural frequency | 215.08 | rad/s |
| damping ratio | 2.015 | |
| maximum speed | 7848.74 | deg/s | assume t3 = 0.86 ms, x3 = 0.046141 deg, v2 = 0.012088 deg/s switching times & velocity of 3rd order bang-bang control

| i | t1 (ms) | t2 (ms) | ts (ms) | x1 (deg) | x2 (deg) | xs (deg) | v1 (deg/s) |
|---|---|---|---|---|---|---|---|
| 0 | 0.93 | 2.71 | 3.57 | 0.040 | 0.242 | 0.288 | 121.714 |
| 1 | 1.30 | 3.41 | 4.27 | 0.103 | 0.536 | 0.582 | 217.113 |
| 2 | 1.67 | 4.10 | 4.96 | 0.204 | 0.935 | 0.981 | 327.953 |
| 3 | 2.05 | 4.78 | 5.63 | 0.348 | 1.436 | 1.482 | 449.373 |
| 4 | 2.42 | 5.44 | 6.30 | 0.539 | 2.033 | 2.079 | 577.794 |
| 5 | 2.79 | 6.10 | 6.95 | 0.778 | 2.719 | 2.765 | 710.583 |
| 6 | 3.16 | 6.74 | 7.60 | 1.068 | 3.491 | 3.537 | 845.812 |
| 7 | 3.53 | 7.37 | 8.23 | 1.408 | 4.342 | 4.388 | 982.069 |
| 8 | 3.91 | 8.00 | 8.85 | 1.798 | 5.269 | 5.315 | 1118.324 |
| 9 | 4.28 | 8.61 | 9.47 | 2.239 | 6.267 | 6.313 | 1253.834 |
| 10 | 4.65 | 9.22 | 10.08 | 2.731 | 7.332 | 7.379 | 1388.064 |
| 11 | 5.02 | 9.82 | 10.68 | 3.272 | 8.462 | 8.508 | 1520.631 |
| 12 | 5.39 | 10.41 | 11.27 | 3.862 | 9.652 | 9.698 | 1651.269 |
| 13 | 5.77 | 10.99 | 11.85 | 4.500 | 10.900 | 10.946 | 1779.796 |
| 14 | 6.14 | 11.57 | 12.43 | 5.186 | 12.203 | 12.250 | 1906.090 |
| 15 | 6.51 | 12.14 | 13.00 | 5.918 | 13.559 | 13.605 | 2030.076 |
| 16 | 6.88 | 12.71 | 13.56 | 6.695 | 14.965 | 15.012 | 2151.712 |
| 17 | 7.25 | 13.27 | 14.12 | 7.518 | 16.420 | 16.466 | 2270.981 |
| 18 | 7.63 | 13.82 | 14.67 | 8.385 | 17.920 | 17.966 | 2387.883 |
| 19 | 8.00 | 14.37 | 15.22 | 9.294 | 19.464 | 19.510 | 2502.430 |
| 20 | 8.37 | 14.91 | 15.76 | 10.246 | 21.051 | 21.097 | 2614.646 |
| 21 | 8.74 | 15.44 | 16.30 | 11.239 | 22.678 | 22.724 | 2724.559 |
| 22 | 9.11 | 15.98 | 16.83 | 12.272 | 24.344 | 24.390 | 2832.202 |
| 23 | 9.48 | 16.50 | 17.36 | 13.346 | 26.048 | 26.094 | 2937.614 |
| 24 | 9.86 | 17.02 | 17.88 | 14.458 | 27.787 | 27.833 | 3040.831 |
| 25 | 10.23 | 17.54 | 18.40 | 15.607 | 29.561 | 29.607 | 3141.895 |

Note: D3103 VCM ASSUME ROTARY ARM TO BE WELL BALANCED THEORETICAL MAXIMUM ACCELERATION

TABLE II

VCM CONTROL PARAMETERS ANALYSIS - VCPA PROGRAM FOR VCM BANG-BANG CONTROL PARAMETERS CALCULATION BY THE THIRD-ORDER CONTROL THEORY

| input data | | |
|---|---|---|
| moment inertia | 7.680e-006 | $Kg*m^2$ |
| resistance of coil | 13.00 | Ohm |
| inductance of coil | 0.0075 | Henry |
| torque constant | 0.0616 | N*m/A |
| voltage applied | 10.0 | Volt |

| result | | |
|---|---|---|
| mechanical time constant | 0.0263 | sec |
| electrical time constant | 0.5769 | ms |
| natural frequency | 256.67 | rad/s |
| damping ratio | 3.377 | |
| maximum speed | 9301.26 | deg/s | assume t3 = 0.41 ms, x3 = 0.008424 deg, v2 = 0.006466 deg/s switching times & velocity of 3rd order bang-bang control

| i | t1 (ms) | t2 (ms) | ts (ms) | x1 (deg) | x2 (deg) | xs (deg) | v1 (deg/s) |
|---|---|---|---|---|---|---|---|
| 0 | 0.78 | 1.95 | 2.36 | 0.036 | 0.174 | 0.182 | 123.977 |
| 1 | 1.09 | 2.55 | 2.96 | 0.087 | 0.363 | 0.371 | 211.286 |
| 2 | 1.40 | 3.15 | 3.56 | 0.168 | 0.618 | 0.626 | 307.075 |
| 3 | 1.71 | 3.74 | 4.15 | 0.279 | 0.935 | 0.943 | 407.330 |
| 4 | 2.03 | 4.32 | 4.73 | 0.422 | 1.312 | 1.320 | 509.693 |
| 5 | 2.34 | 4.90 | 5.31 | 0.597 | 1.746 | 1.754 | 612.777 |
| 6 | 2.65 | 5.47 | 5.88 | 0.804 | 2.235 | 2.244 | 715.772 |
| 7 | 2.96 | 6.03 | 6.44 | 1.043 | 2.777 | 2.786 | 818.205 |
| 8 | 3.27 | 6.59 | 7.00 | 1.314 | 3.371 | 3.379 | 919.806 |
| 9 | 3.58 | 7.15 | 7.55 | 1.617 | 4.014 | 4.022 | 1020.420 |
| 10 | 3.90 | 7.69 | 8.10 | 1.950 | 4.705 | 4.713 | 1119.961 |
| 11 | 4.21 | 8.24 | 8.65 | 2.315 | 5.442 | 5.450 | 1218.385 |
| 12 | 4.52 | 8.78 | 9.19 | 2.710 | 6.224 | 6.233 | 1315.672 |
| 13 | 4.83 | 9.31 | 9.72 | 3.135 | 7.051 | 7.059 | 1411.817 |
| 14 | 5.14 | 9.84 | 10.25 | 3.590 | 7.919 | 7.928 | 1506.819 |
| 15 | 5.45 | 10.37 | 10.78 | 4.074 | 8.829 | 8.838 | 1600.688 |
| 16 | 5.77 | 10.89 | 11.30 | 4.587 | 9.779 | 9.788 | 1693.432 |
| 17 | 6.08 | 11.41 | 11.82 | 5.129 | 10.768 | 10.777 | 1785.062 |
| 18 | 6.39 | 11.92 | 12.33 | 5.700 | 11.795 | 11.804 | 1875.590 |
| 19 | 6.70 | 12.43 | 12.84 | 6.298 | 12.859 | 12.867 | 1965.029 |
| 20 | 7.01 | 12.93 | 13.34 | 6.925 | 13.958 | 13.967 | 2053.392 |
| 21 | 7.32 | 13.43 | 13.84 | 7.578 | 15.093 | 15.101 | 2140.691 |
| 22 | 7.64 | 13.93 | 14.34 | 8.259 | 16.261 | 16.270 | 2226.938 |
| 23 | 7.95 | 14.43 | 14.84 | 8.967 | 17.462 | 17.471 | 2312.147 |
| 24 | 8.26 | 14.92 | 15.33 | 9.700 | 18.696 | 18.704 | 2396.330 |

TABLE II-continued

VCM CONTROL PARAMETERS ANALYSIS - VCPA PROGRAM FOR VCM BANG-BANG CONTROL PARAMETERS CALCULATION BY THE THIRD-ORDER CONTROL THEORY

| 25 | 8.57 | 15.40 | 15.81 | 10.460 | 19.961 | 19.969 | 2479.498 |

Note: D3103 VCM ASSUME ROTARY ARM TO BE WELL BALANCED USING 1 mm SHORTED TURN, Kf REDUCED TO 84.4%

TABLE III

VCM CONTROL PARAMETERS ANALYSIS - VCPA PROGRAM FOR VCM BANG-BANG CONTROL PARAMETERS CALCULATION BY THE THIRD-ORDER CONTROL THEORY

| input data | |
|---|---|
| moment inertia | 7.680e-006 Kg*m$^2$ |
| resistance of coil | 13.00 Ohm |
| inductance of coil | 0.0100 Henry |
| torque constant | 0.0730 N*m/A |
| voltage applied | 10.0 Volt |

| result | |
|---|---|
| mechanical time constant | 0.0187 sec |
| electrical time constant | 0.7692 ms |
| natural frequency | 263.42 rad/s |
| damping ratio | 2.468 |
| maximum speed | 7848.74 deg/s | assume t3 = 0.56 ms, x3 = 0.018979 deg, v2 = 0.010284 deg/s switching times & velocity of 3rd order bang-bang control

| i | t1 (ms) | t2 (ms) | ts (ms) | x1 (deg) | x2 (deg) | xs (deg) | v1 (deg/s) |
|---|---|---|---|---|---|---|---|
| 0 | 0.76 | 2.06 | 2.62 | 0.032 | 0.177 | 0.196 | 115.560 |
| 1 | 1.06 | 2.64 | 3.20 | 0.079 | 0.380 | 0.399 | 202.776 |
| 2 | 1.37 | 3.21 | 3.77 | 0.156 | 0.655 | 0.674 | 301.951 |
| 3 | 1.67 | 3.77 | 4.33 | 0.264 | 0.999 | 1.018 | 408.659 |
| 4 | 1.97 | 4.33 | 4.88 | 0.405 | 1.409 | 1.428 | 519.879 |
| 5 | 2.28 | 4.87 | 5.43 | 0.580 | 1.881 | 1.900 | 633.553 |
| 6 | 2.58 | 5.41 | 5.97 | 0.789 | 2.411 | 2.430 | 748.277 |
| 7 | 2.89 | 5.94 | 6.50 | 1.034 | 2.997 | 3.016 | 863.105 |
| 8 | 3.19 | 6.47 | 7.03 | 1.314 | 3.637 | 3.656 | 977.394 |
| 9 | 3.49 | 6.99 | 7.55 | 1.628 | 4.327 | 4.346 | 1090.717 |
| 10 | 3.80 | 7.50 | 8.06 | 1.976 | 5.066 | 5.085 | 1202.790 |
| 11 | 4.10 | 8.01 | 8.57 | 2.358 | 5.851 | 5.870 | 1313.428 |
| 12 | 4.40 | 8.51 | 9.07 | 2.774 | 6.681 | 6.700 | 1422.515 |
| 13 | 4.71 | 9.01 | 9.56 | 3.222 | 7.554 | 7.573 | 1529.980 |
| 14 | 5.01 | 9.50 | 10.06 | 3.703 | 8.468 | 8.487 | 1635.785 |
| 15 | 5.31 | 9.98 | 10.54 | 4.215 | 9.421 | 9.440 | 1739.911 |
| 16 | 5.62 | 10.47 | 11.02 | 4.760 | 10.413 | 10.432 | 1842.356 |
| 17 | 5.92 | 10.94 | 11.50 | 5.334 | 11.441 | 11.460 | 1943.127 |
| 18 | 6.23 | 11.41 | 11.97 | 5.940 | 12.505 | 12.524 | 2042.238 |
| 19 | 6.53 | 11.88 | 12.44 | 6.575 | 13.603 | 13.622 | 2139.706 |
| 20 | 6.83 | 12.34 | 12.90 | 7.239 | 14.734 | 14.753 | 2235.552 |
| 21 | 7.14 | 12.80 | 13.36 | 7.932 | 15.897 | 15.916 | 2329.798 |
| 22 | 7.44 | 13.26 | 13.82 | 8.654 | 17.090 | 17.109 | 2422.469 |
| 23 | 7.74 | 13.71 | 14.27 | 9.404 | 18.313 | 18.332 | 2513.588 |
| 24 | 8.05 | 14.16 | 14.72 | 10.181 | 19.566 | 19.584 | 2603.180 |
| 25 | 8.35 | 14.60 | 15.16 | 10.985 | 20.845 | 20.864 | 2691.270 |

Figure 6:
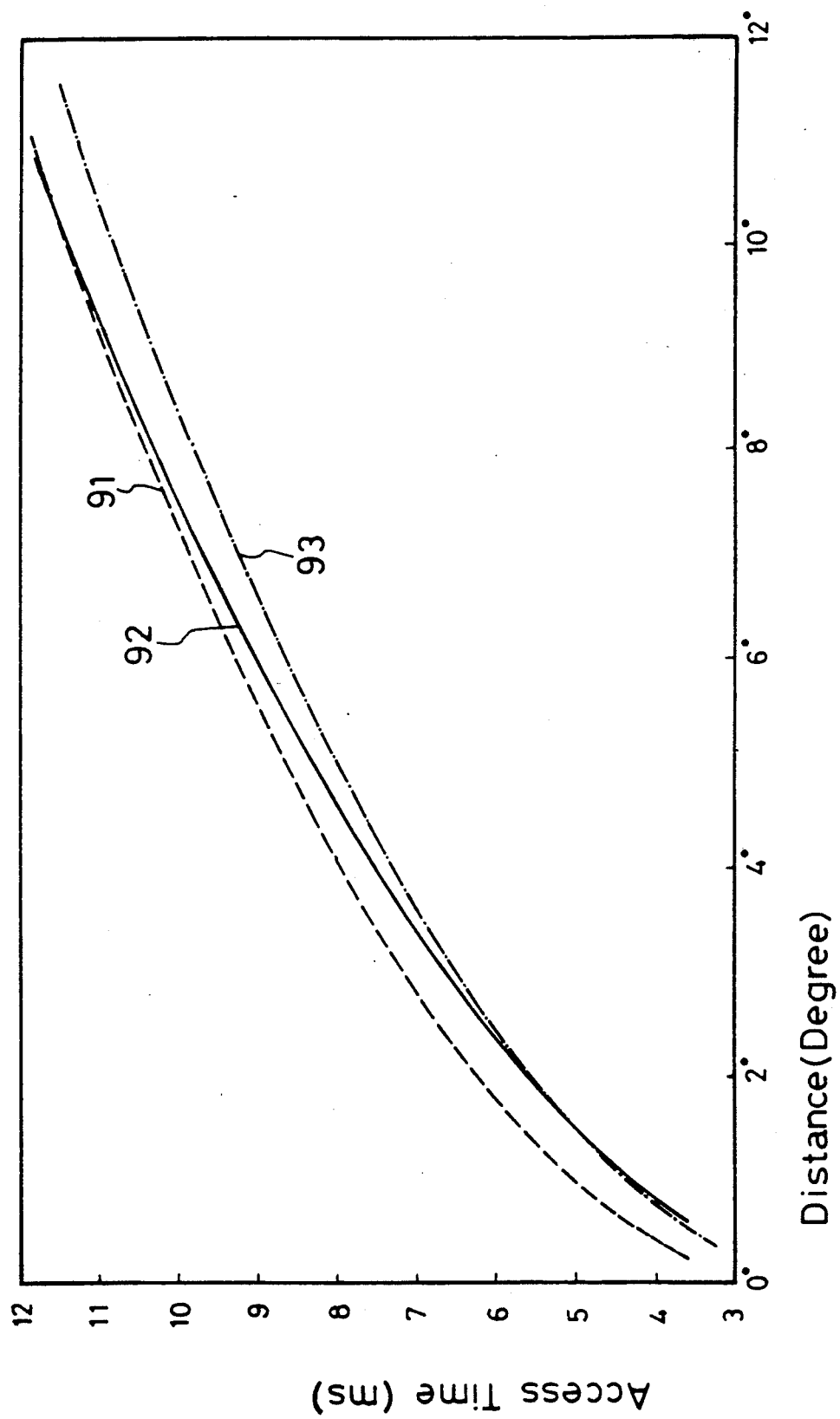
FIG. 6 is a chart showing the relations between the rotation degree and the access time of three examples for voice coil motor.
Figure 7:
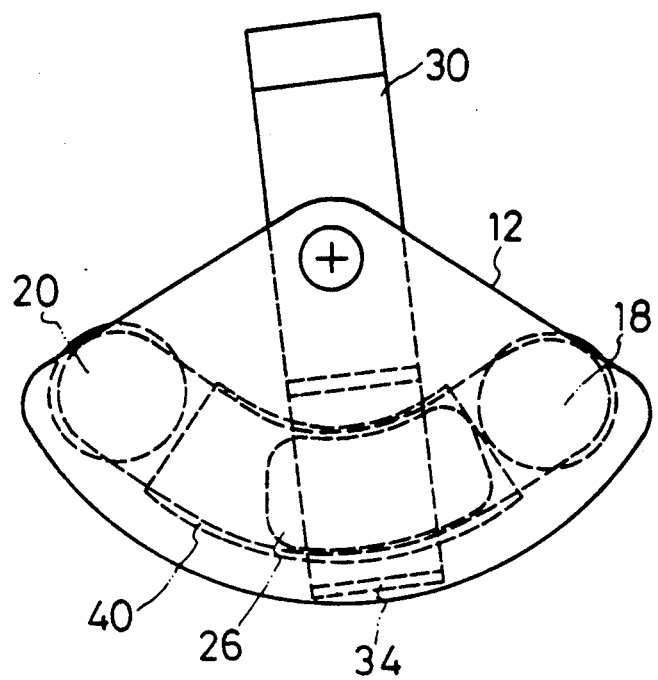
FIG. 7 (prior art) is a top elevational view of a prior art voice coil motor.
Figure 8:
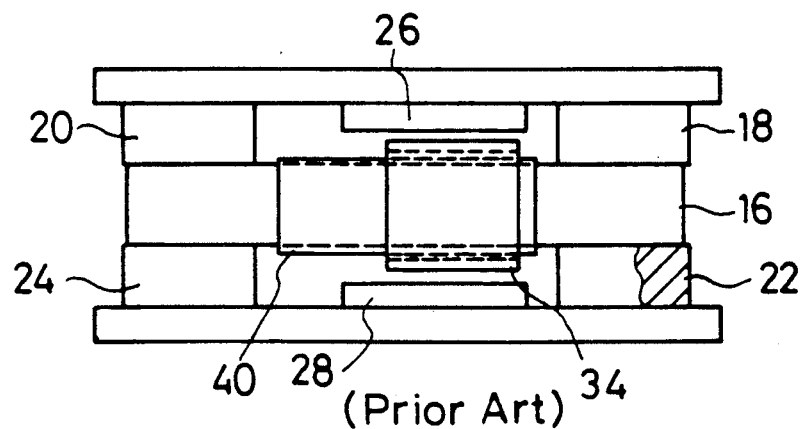
FIG. 8 (prior art) is a partially fragmentary, front elevational view of the prior art voice coil motor shown in FIG. 7.

Note: D3103 VCM ASSUME ROTARY ARM TO BE WELL BALANCED THEORETICAL MAXIMUM ACCELERATION According to the data listed in Tables I to III, a set of relation curves is drawn in FIG. 6. The vertical axis represents the access time while the horizontal axis represents the angle of rotation. Curve 91 represents the comparative example which is provided with no shorted turn. Curve 92 represents the conventional voice coil motor while curve 93 represents the voice coil motor of the present invention. It may be found from FIG. 6 that the access time for the comparative example voice coil motor is longer than the access times for the conventional voice coil motor and the voice coil motor of the present invention. The access time of the conventional voice coil motor is shorter than that of the present invention only when the distance of movement is less than 2 degrees. When the distance of movement is larger than 2 degrees, the access time for the voice coil motor of the present invention is shorter than those for the comparative example and the conventional voice coil motors. Taking the distance of movement of a magnetic disk drive and the probability into consideration, it may be noted that an average distance of movement for a 100 MegaByte magnetic disk drive is one third of its travel and is approximately 8 degrees. It is therefore apparent that when incorporated into a magnetic disk drive which has an average distance movement substantially larger than 2 degrees, such as a 100 MegaByte disk dirve, the voice coil motor of the present invention will have advantages and effects over the comparative example and the conventional voice coil motors. Furthermore, the present invention is desirable in that the voice coil motor may be manufactured at a substantially lower cost.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is Claimed Is:

1. A voice coil motor including an upper yoke having a lower surface; a lower yoke having an upper surface; two upper side yokes attached to said lower surface of said upper yoke respectively at laterally opposite end positions on said lower surface of said upper yoke; two lower side yokes attached to said upper surface of said lower yoke respectively at laterally opposite end positions on said upper surface of said lower yoke; a central yoke having two distal end portions respectively sandwiched between said upper side yokes and said lower side yokes; an upper magnet attached to said lower surface of said upper yoke and located above said central yoke; a lower magnet attached to said upper surface of said lower yoke and located beneath said central yoke; and a rotary arm pivotally mounted on said upper yoke, said rotary arm having a coil wound around said central yoke with a spacing being maintained therebetween so that said rotary arm is allowed to pivot along said central yoke; the voice coil motor being characterized in that the motor includes at least one shorted turn fitted around one of said side yokes.

* * * * *